(12) United States Patent
Anderson et al.

(10) Patent No.: US 9,218,195 B2
(45) Date of Patent: Dec. 22, 2015

(54) VENDOR-INDEPENDENT RESOURCE CONFIGURATION INTERFACE FOR SELF-VIRTUALIZING INPUT/OUTPUT DEVICE

(75) Inventors: Gary D. Anderson, Austin, TX (US); Charles S. Graham, Rochester, MN (US); Andrew T. Koch, Rochester, MN (US); Bryan M. Logan, Rochester, MN (US); Kyle A. Lucke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 13/109,289

(22) Filed: May 17, 2011

(65) Prior Publication Data

US 2012/0297379 A1    Nov. 22, 2012

(51) Int. Cl.
  *G06F 9/46* (2006.01)
  *G06F 15/16* (2006.01)
  *G06F 9/455* (2006.01)
  *G06F 9/50* (2006.01)

(52) U.S. Cl.
  CPC .......... *G06F 9/45558* (2013.01); *G06F 9/5077* (2013.01); *G06F 2009/45579* (2013.01)

(58) Field of Classification Search
  None
  See application file for complete search history.

(56) References Cited

U.S. PATENT DOCUMENTS

| | | | |
|---|---|---|---|
| 6,427,177 B1 | 7/2002 | Chang | |
| 6,721,826 B2 | 4/2004 | Hoglund | |
| 6,725,284 B2 | 4/2004 | Arndt | |
| 6,877,158 B1 | 4/2005 | Arndt | |
| 7,207,041 B2 | 4/2007 | Elson et al. | |
| 7,870,301 B2 | 1/2011 | Arndt et al. | |
| 8,086,903 B2 | 12/2011 | Arndt et al. | |
| 8,095,701 B2 | 1/2012 | Tarui et al. | |
| 8,141,092 B2 | 3/2012 | Brown et al. | |
| 8,141,093 B2 | 3/2012 | Brown et al. | |
| 8,156,253 B2 | 4/2012 | Watanabe | |
| 8,219,988 B2 | 7/2012 | Armstrong et al. | |
| 8,219,989 B2 | 7/2012 | Armstrong et al. | |
| 8,473,947 B2 * | 6/2013 | Goggin et al. | 718/1 |
| 8,561,065 B2 | 10/2013 | Cunningham et al. | |
| 8,561,066 B2 | 10/2013 | Koch et al. | |

(Continued)

OTHER PUBLICATIONS

Direct Assignment for Virtualized I/O, Enabling I/O—Intensive Applications for Server Virtualization (2009).

(Continued)

*Primary Examiner* — Mengyao Zhe
*Assistant Examiner* — Bing Zhao
(74) *Attorney, Agent, or Firm* — Middleton Reutlinger

(57) ABSTRACT

A vendor-independent resource configuration interface automatically maps virtual functions to physical functions in a self-virtualizing IO resource using the concept of a logical port that maps to a particular physical port and protocol in the self-virtualizing IO resource. A user wishing to provide a logical partition access to a self-virtualizing IO resource typically creates or configures a logical port for the logical partition by mapping the logical port to a particular physical port and protocol defined for the self-virtualizing IO resource, and an appropriate virtual function mapped to an appropriate physical function on an appropriate self-virtualizing IO resource is automatically selected, typically without requiring the user to have a detailed understanding of the numbers of supported virtual functions, physical functions and protocols supported by specific resources.

23 Claims, 9 Drawing Sheets

(56) References Cited

U.S. PATENT DOCUMENTS

| | | |
|---|---|---|
| 8,645,974 B2 | 2/2014 | Armstrong et al. |
| 2001/0037301 A1 | 11/2001 | Shepley et al. |
| 2003/0204648 A1 | 10/2003 | Arndt |
| 2006/0147235 A1 | 7/2006 | Sadovsky et al. |
| 2006/0195634 A1 | 8/2006 | Arndt et al. |
| 2006/0195673 A1 | 8/2006 | Arndt et al. |
| 2006/0225073 A1 | 10/2006 | Akagawa et al. |
| 2007/0008887 A1 | 1/2007 | Gorbatov et al. |
| 2007/0050764 A1 | 3/2007 | Traut |
| 2007/0078988 A1* | 4/2007 | Miloushev et al. ............ 709/227 |
| 2007/0220246 A1 | 9/2007 | Powell et al. |
| 2008/0082975 A1 | 4/2008 | Oney et al. |
| 2008/0091855 A1 | 4/2008 | Moertl et al. |
| 2008/0189715 A1 | 8/2008 | Armstrong et al. |
| 2008/0276246 A1 | 11/2008 | Armstrong et al. |
| 2008/0301692 A1 | 12/2008 | Billau et al. |
| 2009/0037906 A1 | 2/2009 | Armstrong et al. |
| 2009/0037908 A1 | 2/2009 | Armstrong et al. |
| 2009/0037941 A1 | 2/2009 | Armstrong et al. |
| 2009/0049453 A1 | 2/2009 | Baran et al. |
| 2009/0144731 A1 | 6/2009 | Brown et al. |
| 2009/0212104 A1 | 8/2009 | Smith et al. |
| 2009/0217275 A1 | 8/2009 | Krishnamurthy et al. |
| 2009/0248937 A1 | 10/2009 | Solomon et al. |
| 2009/0276605 A1 | 11/2009 | Arndt et al. |
| 2009/0276773 A1 | 11/2009 | Brown et al. |
| 2009/0313391 A1 | 12/2009 | Watanabe et al. |
| 2010/0014526 A1 | 1/2010 | Chavan et al. |
| 2010/0082874 A1 | 4/2010 | Baba et al. |
| 2010/0095310 A1 | 4/2010 | Oshins et al. |
| 2010/0180274 A1 | 7/2010 | Cherian et al. |
| 2010/0290473 A1 | 11/2010 | Enduri et al. |
| 2011/0239213 A1 | 9/2011 | Aswani et al. |
| 2011/0289360 A1 | 11/2011 | Cathro |
| 2012/0005521 A1 | 1/2012 | Droux et al. |
| 2012/0042034 A1 | 2/2012 | Goggin et al. |
| 2012/0124572 A1 | 5/2012 | Cunningham et al. |
| 2012/0137288 A1 | 5/2012 | Barrett et al. |
| 2012/0151472 A1 | 6/2012 | Koch et al. |
| 2012/0180048 A1 | 7/2012 | Brownlow et al. |
| 2012/0210044 A1 | 8/2012 | Armstrong et al. |

OTHER PUBLICATIONS

Raj et al. "High performance and scalable I/O virtualization via self-virtualized devices", Proceedings of the 16th international symposium on High perofmrance distributed computing, 2007, pp. 179-188.

U.S. Patent and Trademark Office, Office Action issued in related U.S. Appl. No. 12/946,316, dated Oct. 15, 2012.

U.S. Patent and Trademark Office, Final Office Action issued in related U.S. Appl. No. 12/946,316, dated Mar. 14, 2013.

U.S. Patent and Trademark Office, Office Action issued in related U.S. Appl. No. 12/963,256, dated Feb. 7, 2013.

U.S. Patent and Trademark Office, Office Action issued in related U.S. Appl. No. 12/963,300, dated Oct. 18, 2012.

U.S. Patent and Trademark Office, Final Office Action issued in related U.S. Appl. No. 12/963,300, dated Mar. 14, 2013.

U.S. Patent and Trademark Office, Notice of Allowance issued in related U.S. Appl. No. 12/946,316, dated Jun. 10, 2013.

U.S. Patent and Trademark Office, Final Office Action issued in related U.S. Appl. No. 12/963,256, dated Aug. 5, 2013.

U.S. Patent and Trademark Office, Notice of Allowance issued in related U.S. Appl. No. 12/963,300, dated Jun. 10, 2013.

U.S. Patent and Trademark Office, Notice of Allowance issued in related U.S. Appl. No. 12/963,256, dated Mar. 14, 2014.

U.S. Patent and Trademark Office, Office Action issued in related U.S. Appl. No. 12/955,698, dated Aug. 15, 2013.

U.S. Patent and Trademark Office, Notice of Allowance issued in related U.S. Appl. No. 12/955,698, dated Mar. 14, 2014.

* cited by examiner

VENDOR-INDEPENDENT RESOURCE CONFIGURATION INTERFACE FOR SELF-VIRTUALIZING INPUT/OUTPUT DEVICE

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, it has been found that the configuration of self-virtualizing IO resources such as SRIOV Ethernet adapters can be problematic due to differences in different makes and models of adapters. Mapping LPARs and VFs to PFs may require a user to be aware of the specific numbers of VFs and PFs supported by each adapter, as well as across all available adapters, and a risk exists that a user may allocate VFs and PFs across adapters in a sub-optimal manner, thereby limiting system performance and capabilities.

A need therefore exists in the art for a manner of simplifying the configuration and management of self-virtualizing IO resources in a logically partitioned computer.

SUMMARY OF THE INVENTION

The invention addresses these and other problems associated with the prior art by providing a vendor-independent resource configuration interface that automatically maps virtual functions to physical functions in a self-virtualizing IO resource using the concept of a logical port that maps to a particular physical port and protocol in the self-virtualizing IO resource. A user wishing to provide a logical partition access to a self-virtualizing IO resource typically creates or configures a logical port for the logical partition by mapping the logical port to a particular physical port and protocol defined for the self-virtualizing IO resource, and an appropriate virtual function mapped to an appropriate physical function on an appropriate self-virtualizing IO resource is automatically selected, typically without requiring the user to have a detailed understanding of the numbers of supported virtual functions, physical functions and protocols supported by specific resources.

Therefore, consistent with one aspect of the invention, a self-virtualizing input/output (IO) resource is managed in a logically partitioned data processing system. The self-virtualizing IO resource includes a plurality of physical functions, a plurality of physical ports, and a plurality of protocols, with each physical function associated with a physical port from among the plurality of physical ports and a protocol from among the plurality of protocols, and with each physical function associated with a plurality of virtual functions. The self-virtualizing IO resource is managed by mapping a logical port to a selected physical port from among the plurality of physical ports and a selected protocol from among the plurality of protocols, and automatically assigning a virtual function to the logical port from among the plurality of virtual functions associated with the physical function associated with the selected physical port and selected protocol.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention facilitate user configuration of self-virtualizing IO resources by utilizing a resource configuration interface that automatically maps virtual functions to physical functions using the concept of a logical port that maps to a particular physical port and protocol in a self-virtualizing IO resource. A user wishing to provide a logical partition access to a self-virtualizing IO resource is essentially required create or configure a logical port for the logical partition that is mapped to a particular physical port and protocol defined in the system, and the system automatically selects an appropriate virtual function mapped to an appropriate physical function on an appropriate self-virtualizing IO resource, typically without requiring the user to have a detailed understanding of the numbers of supported virtual functions, physical functions and protocols supported by specific resources.

Hardware and Software Environment

Figure 1:
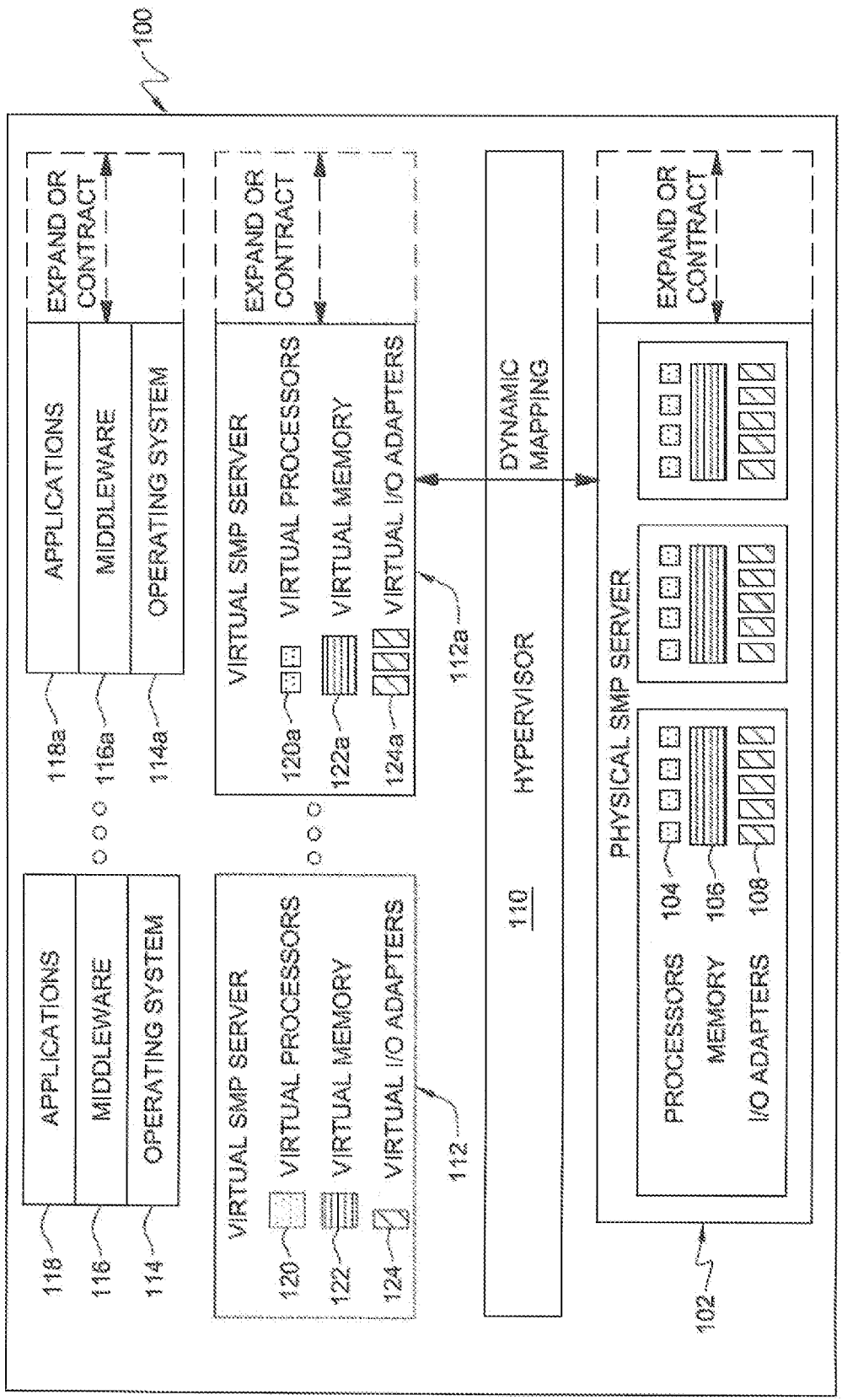
FIG. 1 is a block diagram of one embodiment of a data processing system configured to implement one or more aspects of the present invention.

Now turning to the Drawings, wherein like numbers denote like parts throughout the several views, FIG. 1 is a block diagram of a data processing system or computer 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multithreading (SMT)-capable processor that is capable of concurrently executing multiple different threads on the processor.

A virtual server, or logical partition, is a proxy for a physical server that has the same capabilities, interfaces, and state.

Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
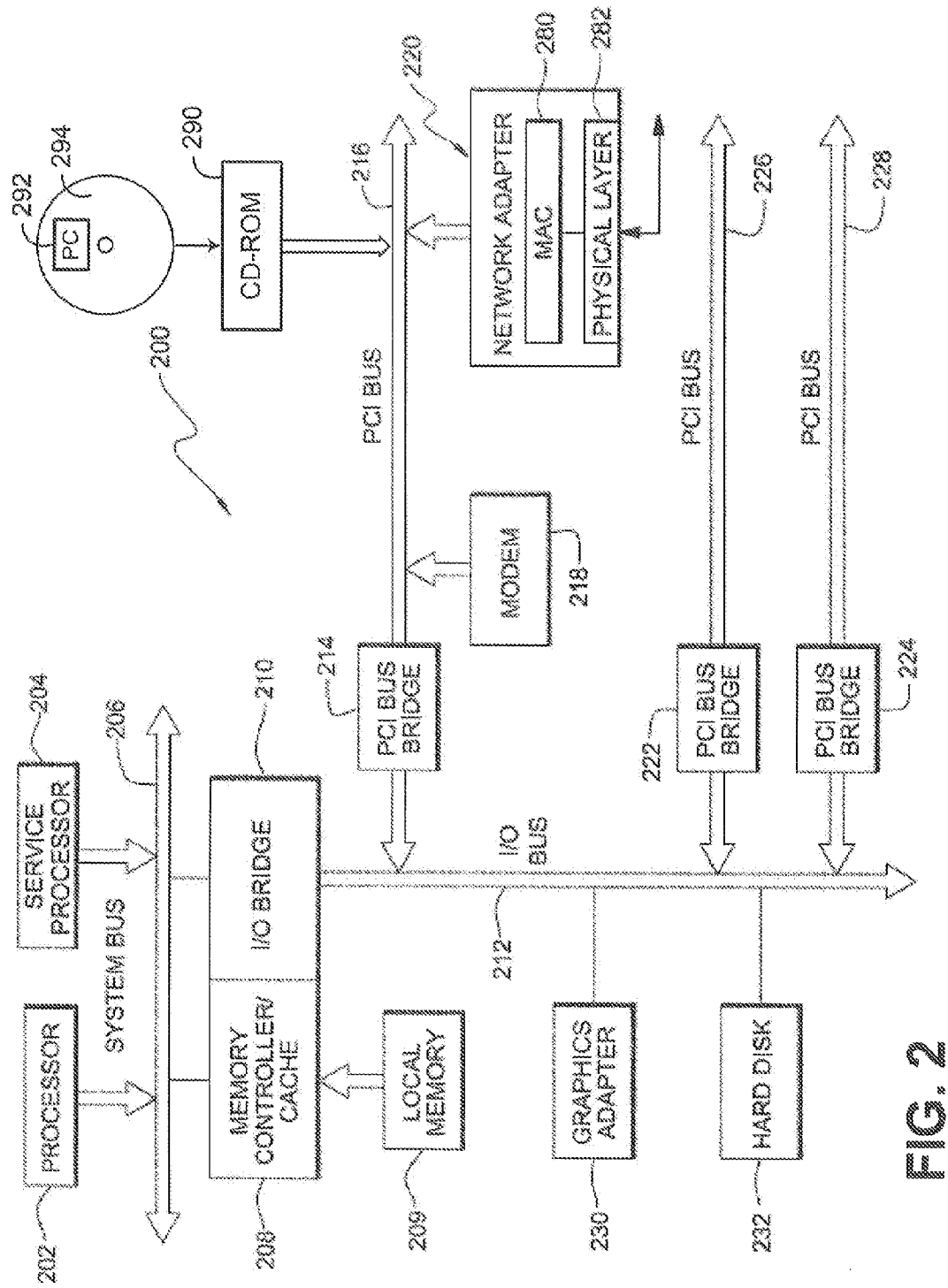
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org.

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
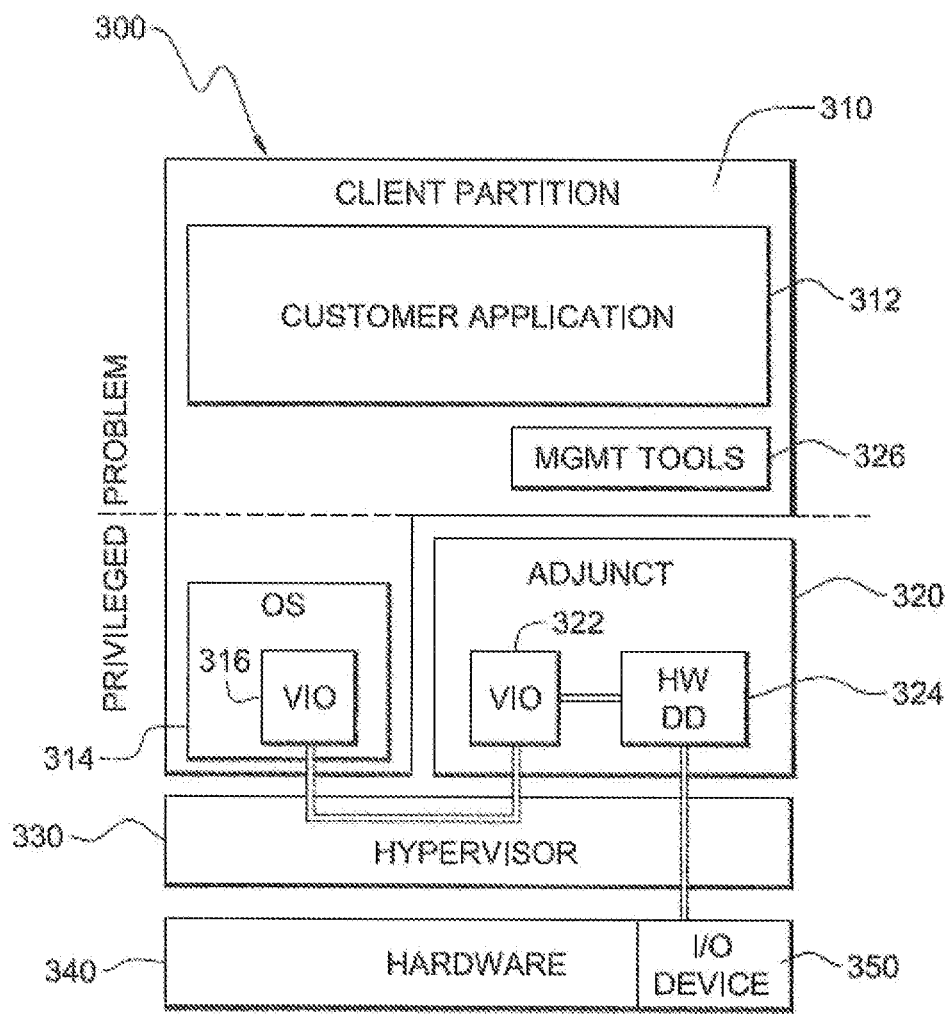
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
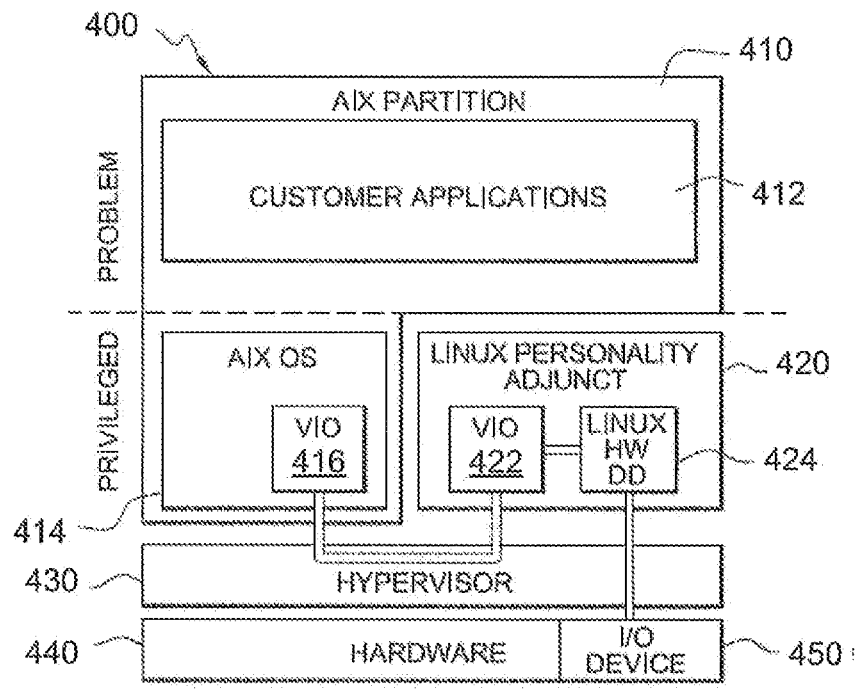
FIGS. 4A & 4B illustrate examples of an adjunct partition configuration wherein non-native operating system's device drivers are employed to access or use a physical input/output device, in accordance with an aspect of the present invention.
Figure 4B:
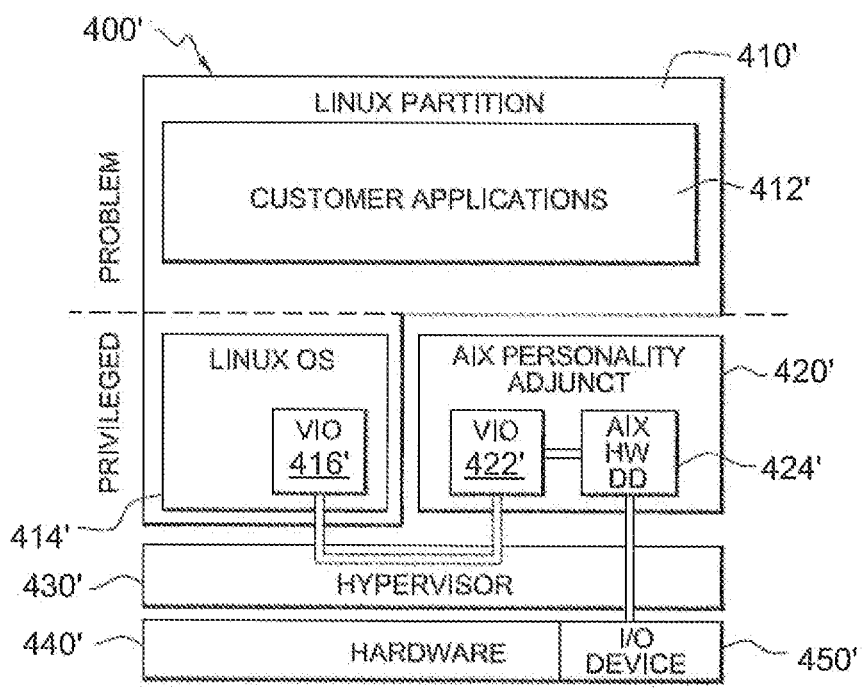

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
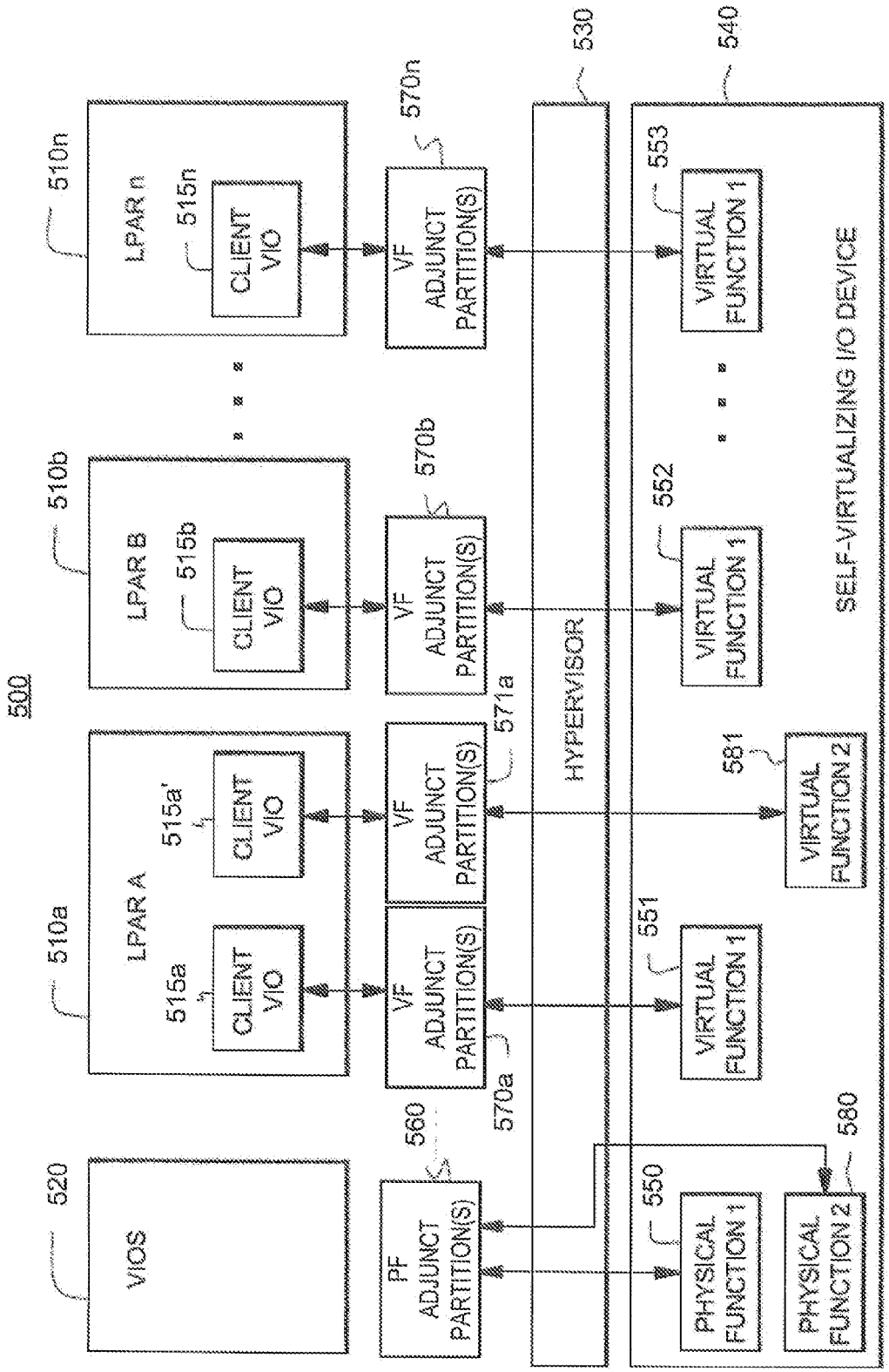
FIG. 5 illustrates one embodiment of a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510a, 510b . . . 510n, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570a, 571a, 570b, 570n are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570a, 570b . . . 570n is the same, while adjunct partition instantiation 571a is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515a, 515a', 515b . . . 515n.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Vendor-Independent Virtual Network Partition Interface

To facilitate the integration of new or upgraded self-virtualizing IO resources such as self-virtualizing network adapters, a vendor-independent partition interface may be utilized between a logical partition and an adjunct partition associated with a self-virtualizing IO resource to effectively abstract away vendor-specific interface details for the self-virtualizing IO resource.

Figure 6A:
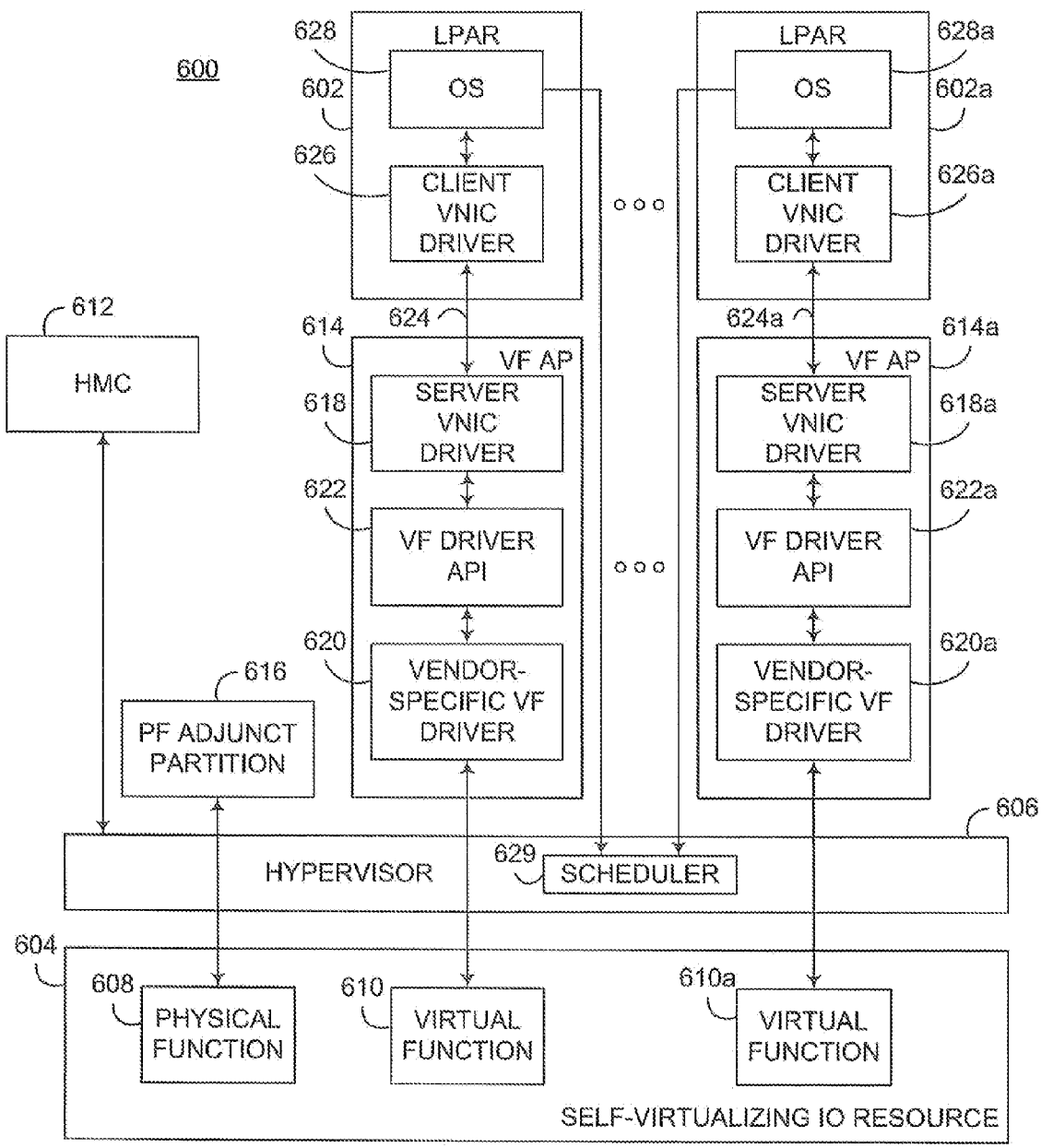
FIGS. 6A & 6B illustrate one embodiment of a data processing system within which a vendor-independent resource configuration interface consistent with the invention may be implemented.

As shown in FIG. 6A, for example, a data processing system 600 may include multiple logical partitions 602, 602a interfacing with a self-virtualizing IO resource 604 through a hypervisor 606. Hypervisor 606 executes on top of other underlying system hardware in addition to self-virtualizing IO resource 604; however, only resource 604 is illustrated to facilitate a better understanding of the invention. The self-virtualizing input/output device 604 is, in one embodiment, an input/output virtualization capable I/O adapter, e.g., an SRIOV network adapter. This adapter may present multiple physical functions, each of which presenting the functionality associated with a non-virtualized I/O adapter, and each with multiple virtual function instances associated therewith, e.g., physical function 608 with associated virtual function instances 610, 610a. A hardware management console (HMC) 612, run above a hypervisor 606, may optionally be used to provide higher-level function than that provided by the hypervisor.

Each virtual function 610, 610a is assigned to provide I/O services to a particular logical partition 602, 602a in the data processing system. The logical partitions in question avoid having direct interactions with their virtual functions, so as to maintain hardware abstraction, by employing adjunct partition instances instantiated for each logical partition to virtual function pairing. These adjunct partitions 614, 614a, which are implemented as firmware components for data processing system 600, are referred to as virtual function (VF) adjunct partitions due to the dedicated nature of the adjunct partitions to a particular logical partition to virtual function pairing. For all virtual functions associated with a same underlying hardware device, i.e., physical function 608, the adjunct partition instances instantiated are the same. That is, each adjunct partition instance 614, 614a is the same.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification," and described above in connection with FIG. 5. The physical function would thus contain the SR-IOV capability structure. A virtual function is associated with the physical function, and shares one or more physical resources, such as a link, with the physical function and with other virtual functions that are associated with the same virtual function.

A physical function adjunct partition 616 is employed during initial configuration of the data processing system to facilitate setup of the virtual function adjunct partitions. One, two or more than two physical functions may be implemented within the self-virtualizing input/output device, and each logical partition may access one or more of these physical functions via an associated virtual function of the device.

It the illustrated embodiment, to support access to the self-virtualizing IO resource by the logical partitions, each adjunct partition includes a server device driver 618, 618a, vendor-specific virtual function device driver 620, 620a and virtual function driver API 622, 622a. Server device driver 618, 618a provides a generic, vendor-independent virtual network partition interface 624, 624a with a client device driver 626, 626a in the associated logical partition 602, 602a. The interface is generic and vendor-independent to the extent that the interface does not need to be changed or tailored based upon vendor-specific implementation details of different makes and models of self-virtualizing IO resources. Vendor-specific implementation details are instead handled in the vendor-specific virtual function device driver 620, 620a, which is accessible to the server device driver 618, 618a through a VF driver API 622. API 622, which is optional in some embodiments, further abstracts away implementation details to higher software layers, and further limits the amount of customization required to accommodate new makes and models of self-virtualizing IO resources. In many instances, VF driver API 622 may require no modifications in order to support new or revised vendor-specific virtual function device drivers 620, 620a.

In the illustrated embodiment, the vendor-independent virtual network partition interface relies on a network protocol, referred to herein as a virtual network interface controller (VNIC) protocol, to facilitate communications between client and server device drivers. The herein-described protocol supports the implementation, within a client logical partition, of a VNIC adapter device driver (VNIC client), which is functionally similar to a physical Ethernet adapter device driver, and is thus usable to interface with a virtual function of a self-virtualizing IO resource such as an SRIOV network adapter. The VNIC protocol supports sending and receiving Ethernet-compatible packets, adding receive buffers to the virtualized hardware, handling physical and logical link status, acquiring hardware statistics, and utilizing advanced hardware features like checksum offload. The VNIC protocol also provides tracing, logging, and dumping facilities, and the VNIC protocol desirably requires no changes in any layer 3 or higher communication protocol (e.g. TCP, IP, etc.). The VNIC protocol also desirably has reliability, availability and support (RAS) capabilities, and supports the concept of privileges, e.g., to enable a logical partition to set physical port attributes and run diagnostics. It will be appreciated, however, that a vendor-independent virtual network partition interface may be implemented using different protocols, so the invention is not limited to the particular VNIC protocol described herein.

Additional details regarding the vendor-independent virtual network partition interface may be found, for example, in U.S. patent application Ser. No. 12/946,316, filed on Nov. 15, 2010 by Cunningham et al., and entitled "VIRTUALIZATION OF VENDOR SPECIFIC NETWORK INTERFACES OF SELF-VIRTUALIZING INPUT/OUTPUT DEVICE VIRTUAL FUNCTIONS," which is incorporated by reference herein.

Vendor-Independent Adjunct Management Channel Interface

To facilitate the integration of new or upgraded self-virtualizing IO resources such as self-virtualizing network adapters, a vendor-independent interface may also be utilized between a hypervisor and an adjunct partition associated with a self-virtualizing IO resource to effectively abstract away vendor-specific interface details for managing and configuring the self-virtualizing IO resource.

Figure 6B:
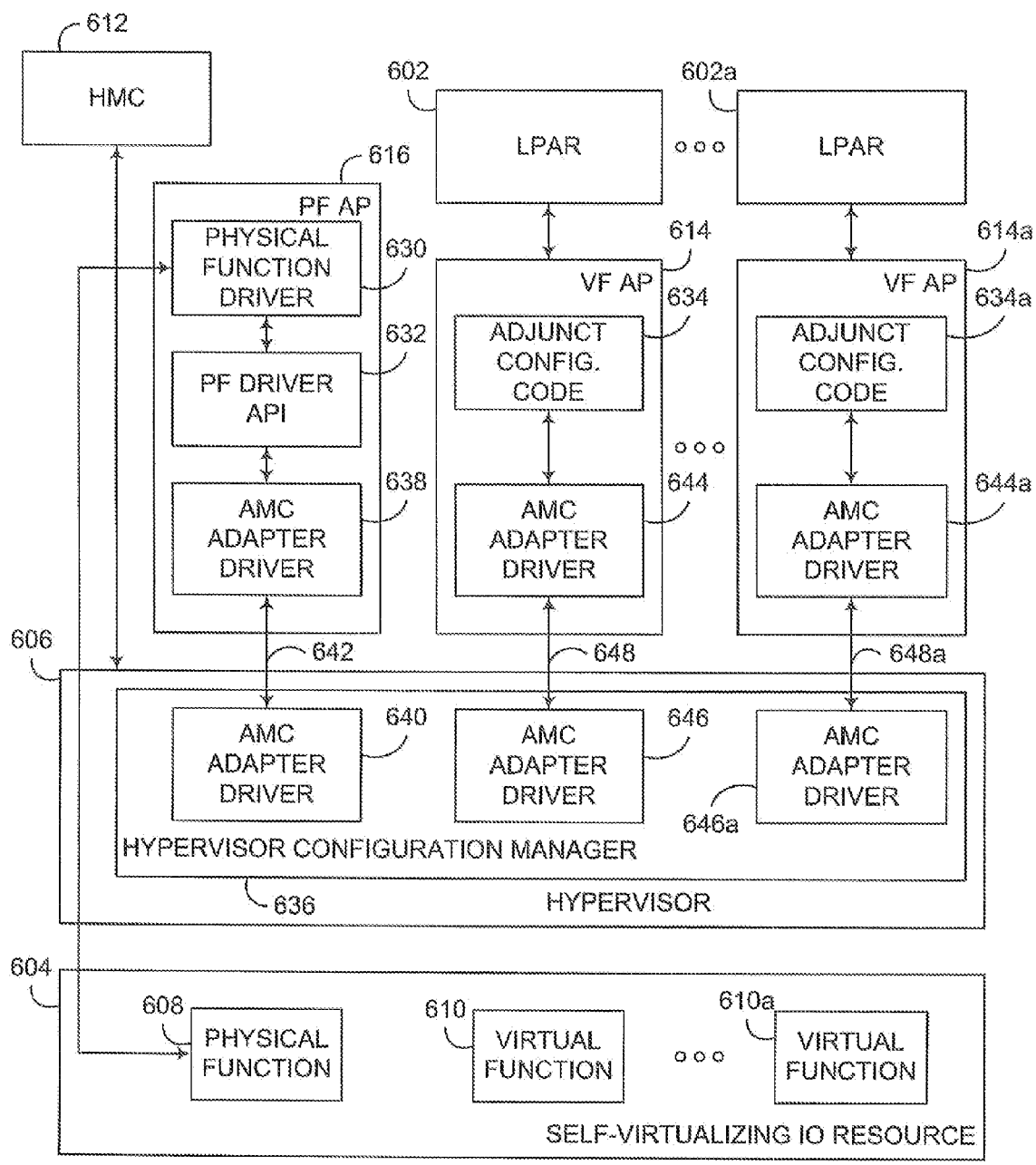

For example, as shown in FIG. 6B, data processing system 600 may also support a vendor independent adjunct management channel (AMC) interface to support the configuration and management of a self-virtualizing IO resource and its associated adjunct partitions. It the illustrated embodiment, physical function adjunct partition 616 includes a physical function device driver 630, which is used to access physical function 608 of resource 604 for the purpose of managing and configuring the resource. An Applications Programming Interface (API) 632 may also be used to abstract vendor-specific details of a particular resource 604.

Each virtual function adjunct partition 614, 614a includes adjunct configuration program code 634, 634a, which is used to configure the adjunct partition. Hypervisor (PHYP) 606 includes a configuration manager 636, which is used to coordinate configuration and management of resource 604 and the adjunct partitions 614, 614a, 616 associated therewith. In this regard, an AMC interface is utilized between the configuration manager 624 and the adjunct partitions. The AMC interface is implemented using paired virtual adapters resident respectively in the adjunct partitions and the hypervisor.

For physical function adjunct partition 616, for example, an AMC adapter device driver 638 interfaces with a corresponding AMC adapter device driver 640 resident in hypervisor 606 over an AMC channel 642. Likewise, for virtual function adjunct partitions 614, 614a, AMC adapter device drivers 644, 644a interface with corresponding AMC adapter device drivers 646, 646a resident in hypervisor 606 over AMC channels 648, 648a.

In the illustrated embodiment, the AMC interface relies on a network protocol, referred to herein as an AMC protocol, to facilitate communications between paired AMC adapter device drivers, which is similar in many respects to the virtual network interface control (VNIC) protocol described in the aforementioned '316 application. Additional details regarding the AMC protocol may be found, for example, in U.S. patent application Ser. No. 12/955,698, filed on Nov. 29, 2010 by Barrett et al., and entitled "VIRTUALIZATION OF VENDOR SPECIFIC CONFIGURATION AND MANAGEMENT OF SELF-VIRTUALIZING INPUT/OUTPUT DEVICE," which is also incorporated by reference herein.

Vendor-Independent Resource Configuration Interface

Returning to FIG. 6A, in order to facilitate the configuration and management of virtual and physical functions associated with self-virtualizing IO resources such as self-virtualizing network adapters, a vendor-independent resource configuration interface between HMC 612 and hypervisor 606 may also be utilized to effectively abstract away vendor-specific interface details for managing and configuring physical and virtual functions for self-virtualizing IO resources.

In particular, in order to facilitate user configuration of self-virtualizing IO resources, a resource configuration interface consistent with the invention is configured to automatically map virtual functions to physical functions using the concept of a logical port that maps to a particular physical port and protocol in a self-virtualizing IO resource. A user wishing to provide a logical partition access to a self-virtualizing IO resource is essentially required create or configure a logical port for the logical partition that is mapped to a particular physical port and protocol defined in the system, and the system automatically selects an appropriate virtual function mapped to an appropriate physical function on an appropriate self-virtualizing IO resource, typically without requiring the user to have a detailed understanding of the numbers of supported virtual functions, physical functions and protocols supported by specific resources. In addition, in many instances the system is able to efficiently allocate resources within and between the installed self-virtualizing IO resources to enable an optimal allocation of resources to be achieved. Furthermore, in some embodiments, users may be able to specify expected loads when configuring resources such that the system is provided with workload expectations that can be used to further optimize the allocation of resources in the system.

Figure 7:
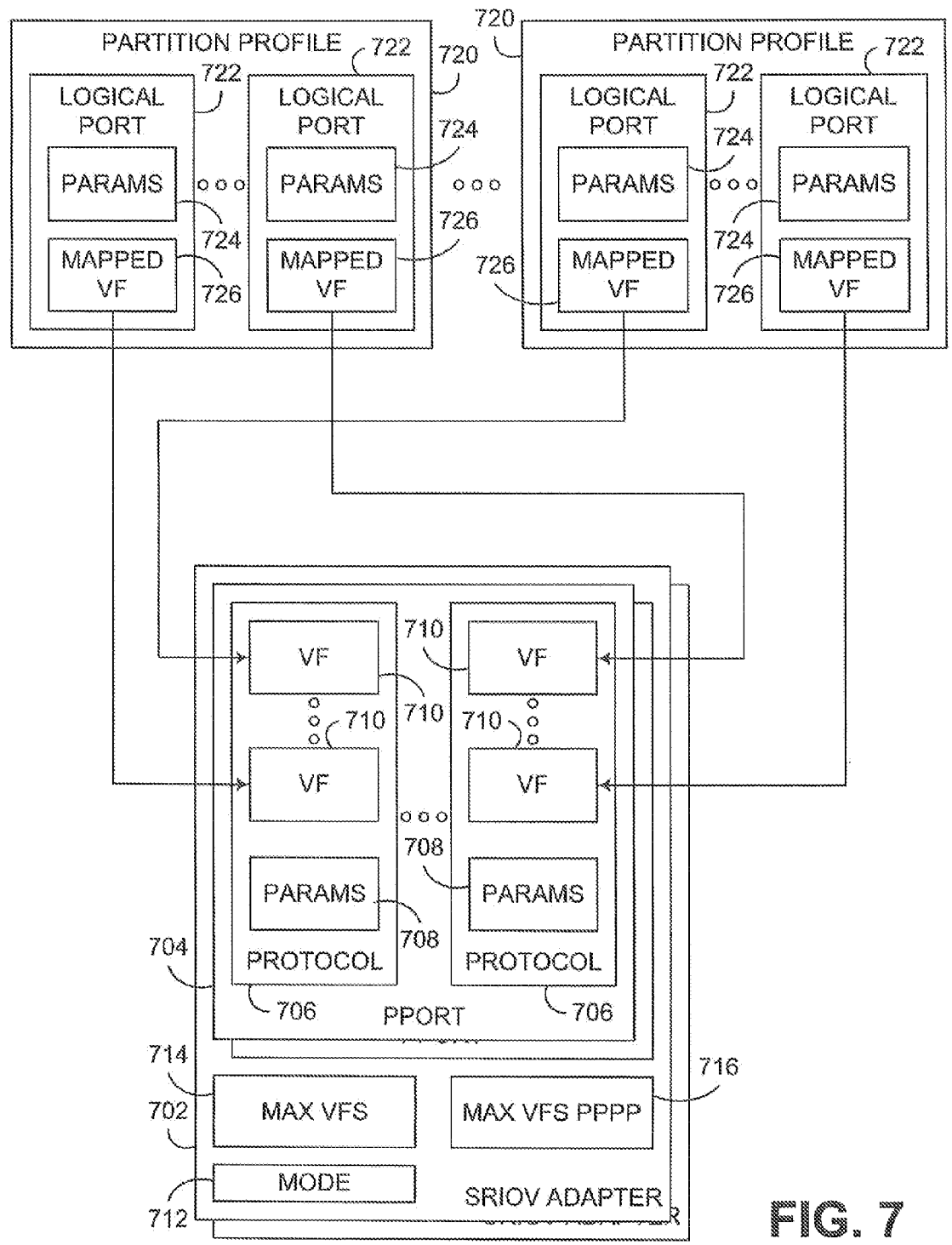
FIG. 7 illustrates exemplary partition profiles and self-virtualizing IO resources in the data processing system of FIGS. 6A-6B.

FIG. 7, for example, illustrates various configuration parameters and entities suitable for implementing the herein-described vendor-independent resource configuration interface in data processing system 600 of FIGS. 6A-6B. In particular, illustrated at 702 are multiple self-virtualizing IO resources, which for the purposes of the discussion hereinafter are SRIOV-compatible network adapters. Each adapter 702 includes one or more physical ports 704, and each physical port 704 may support one or more protocols 706. Typically, each protocol within each physical port is represented as a distinct physical function. Furthermore, each protocol 706 is provided with a set of protocol-specific parameters 708 that in part configure one or more virtual functions 710 associated with the corresponding protocol and physical port.

Also defined for each SRIOV adapter 702 is a mode parameter 712 that controls whether the adapter is running in SRIOV mode or in a dedicated mode. Furthermore, the adapter is constrained by a MAX VFS parameter 714, which defines the maximum number of virtual functions that may be configured in the adapter, and a MAX VFS PPPP parameter 716 that defines the maximum number of virtual functions that can be configured per protocol per port.

Logical partitions are defined by partition profiles 720, and one or more logical ports 722 are created and configured in each partition profile 720. Each logical port includes a set of configuration parameters 724, as well as a mapped virtual function 726 that has been assigned to the partition profile by the system. As such, virtual functions are assigned to specific logical partitions by a user through the creation and configuration of logical ports.

Figure 8:
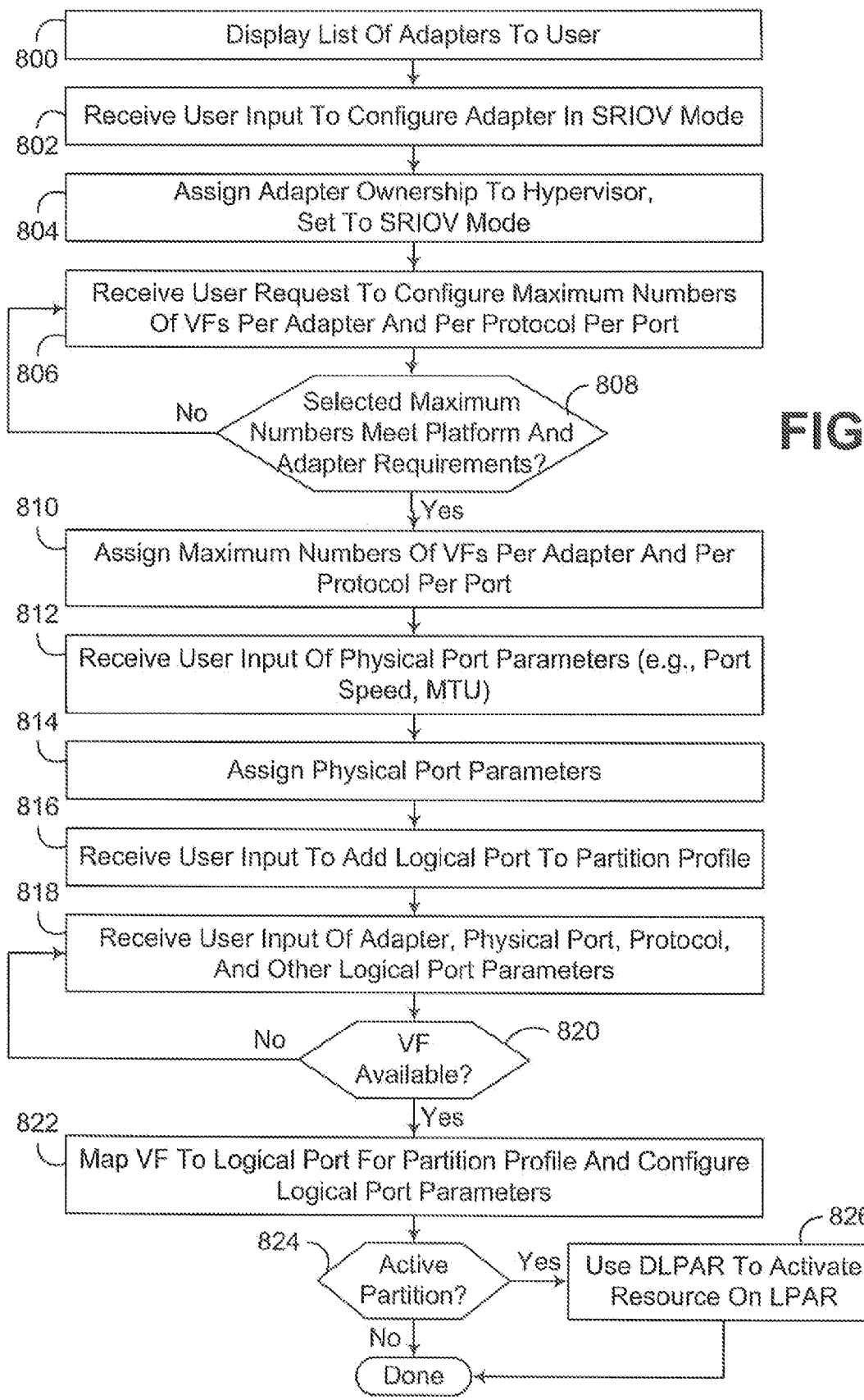
FIG. 8 illustrates a sequence of operations for creating and assigning a logical port to a partition profile in the data processing system of FIGS. 6A-6B.

FIG. 8 illustrates a sequence of operations that may be performed in data processing system 600 to configure an SRIOV adapter for use with a logical partition, e.g., by a user interacting with the system through an HMC. A user is initially presented with a list of available adapters in the system (block 800), and the system receives user input to configure a particular adapter selected by the user into SRIOV mode (block 802). Next, in block 804, the system assigns ownership of the adapter to the hypervisor (as opposed to a particular logical partition as in the case of the adapter being set to a dedicated mode), and sets the adapter to SRIOV mode (e.g., by setting mode parameter 712 (FIG. 7)).

Next, the system receives from the user a request to configure the maximum number of virtual functions for the adapter, as well as the maximum number of virtual functions per protocol per physical port (block 806). Next, in block 808, the system determines whether the selected numbers meet platform and adapter requirements, i.e., so that the numbers do not exceed any hardware limitations of the adapter, and so that the sum of the maximum numbers of virtual functions per protocol per physical port for all protocols and physical ports does not exceed the overall maximum number of virtual functions for the adapter. If so, control returns to block 806 to reenter appropriate values. It will be appreciated that in some instances it may be desirable to select maximum numbers that are below platform and/or adapter maximums to effectively throttle the number of virtual functions created and allow more resources to be dedicated to each virtual function.

If the input numbers are appropriate, block 808 passes control to block 810 to assign the numbers to the adapter parameters (e.g., parameters 714, 716 of FIG. 7). Next, user input is received specifying various physical port parameters such as port speed, MTU size, flow control, etc., and these parameters are assigned in the adapter in block 814.

Next, in block 816, user input is received to add a logical port to a partition profile, which is initiated by a user whenever the user wishes to configure the SRIOV adapter for access by a particular logical partition. In addition, user input is received in block 818 specifying the selected adapter, the selected physical port, the selected protocol, and any specific parameters that may be required for the configuration of the logical port, e.g., QoS capacities, MAC address, MAC and VLAN Access Control List, etc. In some embodiments, the system may present the user with a graphical or textual user interface through which a user can view the available adapters, physical ports and protocols, as well as various configurable parameters, and allow the user to make the selections via conventional user interface controls such as drag-and-drop, drop down menus, text boxes, radio buttons, check boxes, etc. In some instances, data checking may be required to ensure that input data is not invalid, while in other instances, the user's selections may be constrained so that only valid input data can be selected.

Once the user has specified the adapter, physical port and protocol to be mapped to a logical port for a partition profile, control passes to block 820 to determine whether a virtual function is available, i.e., whether a virtual function that is mapped to a particular protocol on a particular physical port for a particular adapter exists and is available to be assigned to the logical port, and thus to the partition profile. It should be appreciated that in many instances, multiple virtual functions may be available for mapping to a partition profile, and that block 820 may base a selection of a virtual function on load balancing concerns to ensure efficient allocation of resources through the system. In addition, the desired logical port parameters may also be used to constrain whether a virtual function is suitable for mapping to the logical port.

If no virtual function is available, block 820 returns control to block 818 to require the user to input alternate selections, e.g., to select a different adapter, protocol and/or physical port, or to change logical port parameters. If a virtual function is available, however, block 820 passes control to block 822 to map the selected virtual function to the logical port for the partition profile (e.g., by assigning the virtual function to the mapped virtual function parameter 726 of FIG. 7) and configure the logical port parameters (e.g., parameters 724 of FIG. 7).

Next, if the partition profile is determined to be associated with an active partition (block 824), control passes to block 826 to use dynamic logical partitioning (DLPAR) functionality in the system to activate the resource on the logical partition associated with the partition profile. As a component of activating the resource, the hypervisor then automatically initiates the required adjunct partitions for the virtual and/or physical functions associated with the resource. Otherwise, if the partition profile is not associated with an active partition, block 826 is skipped. Then, whenever a logical partition associated with the partition profile is activated, the necessary adjunct partitions for the various physical and/or virtual functions will be initiated.

It will also be appreciated that once one logical port is created for a given partition profile, additional logical ports may be added for the same partition profile or another partition profile starting at block 816. Additional operations, such as reconfiguring logical ports, deleting logical ports, etc. may also be supported.

As such, using the sequence of operations disclosed in FIG. 8, a user is able to provide a logical partition with access to a self-virtualizing IO resource such as an SRIOV network adapter merely through the selection of a particular protocol, physical port and adapter to be mapped to a logical port assigned to a logical partition (or a partition profile therefor). Typically, vendor-specific details regarding particular adapters and their capabilities are hidden from the user, with the herein-described interface handling the selection of virtual functions to map to logical ports as well as the configuration of parameters associated with the logical ports and the underlying physical adapter. In addition, resources may be allocated in an efficient manner and typically without requiring a user to try to balance the allocation of resources.

In one particular implementation consistent with the invention, for example, an interface is provided for configuring SRIOV adapters in HMC 612 in a manner that is similar in many respects that that provided for Host Ethernet Adapters (HEA). For an SRIOV adapter, a virtual function equates to a logical port with logical port attributes. Once assigned, a virtual function is typically associated with one and only one physical port, and is presented to a logical partition as a VNIC client using the aforementioned VNIC partition interface.

HMC 612 provides a user interface to configure an SRIOV-capable adapter in SRIOV mode. Typically, before a user can configure an adapter as SRIOV, hypervisor 606 provides information to uniquely distinguish SRIOV-capable adapters as well as SRIOV-capable slots, so that HMC 612 may only show an SRIOV configuration panel if all hardware components (i.e., slot and adapter) support SRIOV.

Hypervisor 606 persists an adapter mode, and commands are provided to read and write this mode. Typically, HMC 612 defaults the configuration to SRIOV mode for user convenience, and HMC 612 provides the ability to configure an SRIOV adapter in a dedicated mode, so that the adapter is owned by a single logical partition and self-virtualizing functionality is disabled, whereby the adapter functions in much the same manner as a conventional adapter.

Typically, the adapter mode cannot be changed from SRIOV to dedicated or back again while any partition (active or shutdown) is using the adapter. Therefore, before the adapter mode can be changed, all virtual functions (for that adapter) typically must be removed from all client logical partitions. In the case of going from SRIOV mode to dedicated mode, there can be many client logical partitions, so this may require several configuration steps on the part of the user. Typically, the adapter removal can be done dynamically in the sense that no changes in client logical partition states are typically required. If the user attempts to change the adapter mode while it is still in use, HMC 612 terminates the operation, and the user is presented with a list of logical partitions still using the adapter.

HMC 612 honors system limitations on the placement of SRIOV adapters used in SRIOV mode. This is implemented by HMC 612 querying hypervisor 606 on the capability for a specific adapter to be placed in SRIOV mode. Hypervisor 606 implements the actual system limitations (e.g., maximum number of SRIOV adapters under an IO hub) and indicates the capability to HMC 612. SRIOV adapters may also be limited to a maximum number in each enclosure, and to only certain slots that support SRIOV adapters.

HMC 612 provides a user interface to configure the number of virtual functions per adapter port when the adapter is in SRIOV mode, based upon system and adapter SRIOV limits, which are provided to HMC 612 by hypervisor 606, including, for example, the number of ports on the adapter, the maximum number of virtual functions for the slot, the maximum number of virtual functions for the adapter, and the maximum number of virtual functions for each adapter port (which need not be the same for all ports). Firmware may also choose limits different than adapter maximums to simplify the user experience. These settings may be modified dynamically, although such actions may cause a warning message (e.g., "this change may result in a short network interruption for all partitions sharing the altered network port."). Both HMC 612 and hypervisor 606 may also enforce that a reconfiguration of virtual functions per port does not conflict with the number of current virtual functions in use. In this context, virtual functions are typically considered in use if they are still assigned to a logical partition that has been activated.

HMC 612 also provides a user interface to configure and retrieve parameters for each Ethernet-type SRIOV port, including, for example, port speed (defaults to Auto), flow control (defaults to On), and Maximum Transmission Unit (MTU) size (defaults to Jumbo packet size: 9 KB). For port speed, hypervisor 606 may provide an interface specifying the speeds supported by each port of an SRIOV adapter, and HMC 612 may be configured to handle an error if the speed reported by hypervisor 606 is not honored. These settings may be modified dynamically, and it may be desirable for HMC 612 to display a warning message (e.g., "This change may result in a short network interruption for all partitions sharing the altered network port.") whenever a port setting is changed.

HMC 612 also provides a user interface to retrieve additional (read only) information for each Ethernet SRIOV port, such as adapter limit of virtual functions, limit of virtual functions for each adapter port, physical link status (for each port), list of virtual functions assigned to active logical partitions and/or non-running logical partitions, the partitions associated with each virtual function (also including hyperlinks to individual logical partition properties views so that logical partition parameters such as bandwidth, VLAN IDs, and special capabilities (diagnostics, promiscuous mode) can be seen and/or modified), and bandwidth parameters for each virtual function, all of which provide a port-wide view of key parameters to help a system administrator assess client logical partition interaction more closely.

Partition level SRIOV configuration may be a part of profile configuration. At a very high level, profile configuration involves a user assigning a virtual function to a profile in much the same manner as a physical adapter (dedicated IO) is assigned. Typically, a resource is associated with a specific physical port, i.e., the resource assignment is based on user selection of the port (versus a specific port virtual function). Selection of the specific port's virtual function, however, is hidden from the user to simplify the configuration process. The virtual function, however, is still persisted by firmware.

A logical partition may utilize multiple virtual SRIOV adapters, however, the partition's memory may constrain this number. Operating systems that provide virtual adapter memory usage information typically will include memory requirements for client VNIC drivers. In addition, there may also be a limit on the number of adjunct partitions a logical partition supports, e.g., as determined by the logical partition's page table size, which is usually determined by the logical partition memory size. Therefore, the number of SRIOV virtual adapters may be limited in order to limit the number of page table entries allocated to adjunct partitions.

HMC 612 provides a user interface to create a logical port which assigns a virtual function to a profile. It is permissible for a user create multiple logical ports for the same SRIOV physical port to the same partition. To facilitate this, HMC 612 allows an SRIOV physical port to be named.

HMC 612 also provides a user interface to configure a logical port assigned to a profile, including parameters such as bandwidth, special partition permissions, and VLAN IDs allowed (defaults to All). Bandwidth may be specified in three parameters: minimum bandwidth, maximum bandwidth and a weight. The minimum may be expressed as an integral percentage of the total bandwidth available on the port. A non-zero default value may be supplied by HMC 612, e.g., 100%/(number of virtual functions/port). The maximum may also be expressed as an integral percentage of the total bandwidth available on the port, and a non-zero default value may be supplied by HMC 612, e.g., 50%.

Special partition permissions may include permission to use promiscuous mode (default Disabled) and permission to perform diagnostics (default Disabled). HMC 612 may provide a warning for the diagnostic capability (e.g., "Note that some diagnostics are disruptive to the adapter's IO traffic.")

SRIOV logical ports may be assigned locally administered MAC addresses at partition activation. A mechanism may be provided to allow a user to override automatically assigned MAC addresses to help ensure uniqueness.

If a profile being activated has a logical port tagged as promiscuous, and the maximum number of promiscuous virtual functions allowed for the corresponding physical port has already been reached, activation will fail and an error message will indicate the cause thereof, with the logical partitions currently using promiscuous mode identified in the error message. Both active and/or inactive logical partitions may be included in the promiscuous user count. Hypervisor 606 provides an interface to return the promiscuous partition limit as well as the list of current enabled logical partitions for a given port.

During activation, a check may be performed on the bandwidth of each port for which a virtual function is being activated. The sum of the minimum bandwidths of all (active and inactive) logical partitions assigned to each port (including the activating partition) is desirably 100% or less. If one or more of the port bandwidths would be exceeded, the activation will fail and an error will indicate the cause, as well as the port(s) with the constrained bandwidth. Hypervisor 606 may also provide an interface to read the current bandwidth usage for one or more SRIOV adapter ports.

For dynamic configuration (DLPAR), HMC 612 provides a user interface to dynamically add a virtual function to a running partition. Execution of a DLPAR add of an SRIOV virtual function proceeds similar to profile activation. HMC 612 also provides a user interface to dynamically remove a virtual function from a running logical partition. HMC 612 enforces that the requested virtual function belongs to the requesting logical partition. HMC 612 permits parameters such as virtual function bandwidth (e.g., minimum and maximum bandwidth, and weight), and permitted VLAN IDs, to be dynamically configured.

For partition migration, SRIOV virtual functions participate in partition migration. SRIOV virtual functions may be located on the target server based on several factors: the adapter class (e.g., Ethernet, Fiber Channel, FcoCE) must match (hypervisor 606 provides an interface to determine compatible SRIOV classes for migration); and for each virtual function being migrated, there must be sufficient available resource (bandwidth) on the target system's chosen physical port to accommodate the minimum bandwidth of the virtual function. MAC addresses assigned to SRIOV virtual functions migrate with the logical partition. If the MAC address prefix of the target system is modified after a logical partition is migrated, the MAC addresses of any virtual functions belonging to a migrated logical partition are not modified. However, if a partition is using a (VIOS) virtual Ethernet that is trunked to an SRIOV adapter, there is no requirement to find a VIOS with an SRIOV Ethernet.

For dynamic adapter installation and repair, as they are PCI family (typically PCI-e) adapters, SRIOV adapters typically can be removed and added dynamically via guided repair (also referred to as concurrent maintenance) procedures. During a field replaceable unit (FRU) add, after powering on the adapter, if hypervisor 606 informs HMC 612 that it is an SRIOV adapter, the user may be given the option to put the adapter in SRIOV mode. During a FRU remove, HMC 612 may unassign virtual functions after varying them off. During an FRU exchange, when the adapter is varied on, if there is a different adapter in the slot than what was originally in the slot, hypervisor 606 may give an error if it detects an invalid configuration. A guided adapter relocation task may be provided to ensure that virtual function DRCs are preserved when an SRIOV adapter is relocated to a different PCI slot. Hypervisor 606 may also provide an interface to extract a DRC "seed" when the SRIOV adapter is in the source slot. Hypervisor 606 may also provide another interface to reseed the DRC when the adapter is powered on in the target slot.

HMC 612 provides a user interface to collect and display port counters from hypervisor 606 for physical ports and virtual functions. HMC 612 also provides a user interface to perform port-level diagnostics Hypervisor 606 provides complementary interfaces for same.

HMC 612 may collect and report adapter vital product data (VPD) for consumption by service planning tools. HMC 612 may also provide a user interface to display the end to end mapping for SRIOV adapters. In this context, the end to end mapping may include the operating system device name and the SRIOV adapter/port, and each operating system typically must provide an interface to retrieve the operating system device name.

It will be appreciated that the implementation of the aforementioned resource configuration functionality in a logically partitioned data processing system would be within the abilities of one of ordinary skill in the art having the benefit of the instant disclosure. It will also be appreciated that that the invention is not limited to the aforementioned implementation.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing a self-virtualizing input/output (IO) resource in a logically partitioned data processing system, wherein the self-virtualizing IO resource includes a plurality of physical functions, a plurality of physical ports, and a plurality of protocols, each physical function associated with a physical port from among the plurality of physical ports and a protocol from among the plurality of protocols, and each physical function associated with a plurality of virtual functions, the method comprising:

in connection with configuring or creating a logical port in response to user input, mapping a logical port to a selected physical port from among the plurality of physical ports and a selected protocol from among the plurality of protocol, wherein the selected physical port and the selected protocol are received from a user in connection with configuring or creating the logical port and are received by a hypervisor in the logically partitioned data processing system over an interface; and in connection with mapping the logical port to the selected physical port and the selected protocol, automatically assigning a virtual function to the logical port from among the plurality of virtual functions associated with the physical function associated with the selected physical port and selected protocol, wherein automatically assigning the virtual function to the logical port is performed by the hypervisor.

2. The method of claim 1, wherein the interface comprises a vendor-independent resource configuration interface.

3. The method of claim 2, wherein the vendor-independent resource configuration interface interfaces a hardware management console with the hypervisor.

4. The method of claim 1, further comprising receiving an expected load from a user, wherein automatically assigning the virtual function to the logical port is based at least in part on the expected load received from the user.

5. The method of claim 1, further comprising configuring a maximum number of virtual functions for the self-virtualizing IO resource in response to user input, wherein automatically assigning the virtual function to the logical port is based at least in part on the maximum number of virtual functions configured for the self-virtualizing IO resource.

6. The method of claim 1, further comprising configuring a maximum number of virtual functions per protocol per physical port for the self-virtualizing IO resource in response to user input, wherein automatically assigning the virtual function to the logical port is based at least in part on the maximum number of virtual functions per protocol per physical port configured for the self-virtualizing IO resource.

7. The method of claim 1, wherein the logical port is associated with a partition profile for a logical partition.

8. The method of claim 1, further comprising creating an adjunct partition for the assigned virtual function after assigning the assigned virtual function to the logical port.

9. The method of claim 8, wherein the adjunct partition includes a separate dispatchable state and employs virtual address space donated from a logical partition or a hypervisor of the data processing system.

10. The method of claim 8, wherein creating the adjunct partition is performed automatically in response to creation of a logical partition for the logical port.

11. The method of claim 1, wherein the self-virtualizing IO resource comprises an SRIOV Ethernet adapter.

12. An apparatus, comprising:
at least one processor; and
program code configured upon execution by the at least one processor to manage a self-virtualizing input/output (IO) resource in a logically partitioned data processing system, wherein the self-virtualizing IO resource includes a plurality of physical functions, a plurality of physical ports, and a plurality of protocols, wherein each physical function is associated with a physical port from among the plurality of physical ports and a protocol from among the plurality of protocols, wherein each physical function is associated with a plurality of virtual functions, and wherein the program code is configured to manage the self-virtualizing IO resource by mapping a logical port to a selected physical port from among the plurality of physical ports and a selected protocol from among the plurality of protocols, and automatically assigning a virtual function to the logical port from among the plurality of virtual functions associated with the physical function associated with the selected physical port and selected protocol;
wherein the program code is configured to map the logical port to the selected physical port and the selected protocol and automatically assign the virtual function to the logical port in connection with configuring or creating the logical port in response to user input, wherein the program code includes a hypervisor, wherein the selected physical port and the selected protocol are received from a user in connection with configuring or creating the logical port and are received by the hypervisor over an interface, and wherein the hypervisor is configured to automatically assign the virtual function to the logical port.

13. The apparatus of claim 12, wherein the interface comprises a vendor-independent resource configuration interface.

14. The apparatus of claim 13, wherein the vendor-independent resource configuration interface interfaces a hardware management console with the hypervisor.

15. The apparatus of claim 12, wherein the program code is further configured to receive an expected load from a user, wherein the program code is configured to automatically assign the virtual function to the logical port based at least in part on the expected load received from the user.

16. The apparatus of claim 12, wherein the program code is further configured to configure a maximum number of virtual functions for the self-virtualizing IO resource in response to user input, and wherein the program code is configured to automatically assign the virtual function to the logical port based at least in part on the maximum number of virtual functions configured for the self-virtualizing IO resource.

17. The apparatus of claim 12, wherein the program code is further configured to configure a maximum number of virtual functions per protocol per physical port for the self-virtualizing IO resource in response to user input, and wherein the program code is configured to automatically assign the virtual function to the logical port based at least in part on the maximum number of virtual functions per protocol per physical port configured for the self-virtualizing IO resource.

18. The apparatus of claim 12, wherein the logical port is associated with a partition profile for a logical partition.

19. The apparatus of claim 12, wherein the program code is further configured to create an adjunct partition for the assigned virtual function after assigning the assigned virtual function to the logical port.

20. The apparatus of claim 19, wherein the adjunct partition includes a separate dispatchable state and employs virtual address space donated from a logical partition or a hypervisor of the data processing system.

21. The apparatus of claim 19, wherein the program code is configured to create the adjunct partition automatically in response to creation of a logical partition for the logical port.

22. The apparatus of claim 12, wherein the self-virtualizing IO resource comprises an SRIOV Ethernet adapter.

23. A program product, comprising:
a non-transitory computer readable medium; and
program code stored on the computer readable medium and configured upon execution to manage a self-virtualizing input/output (IO) resource in a logically partitioned data processing system, wherein the self-virtualizing IO resource includes a plurality of physical functions, a plurality of physical ports, and a plurality of protocols, wherein each physical function is associated with a physical port from among the plurality of physical ports and a protocol from among the plurality of protocols, wherein each physical function is associated with a plurality of virtual functions, and wherein the program code is configured to manage the self-virtualizing IO resource by mapping a logical port to a selected physical port from among the plurality of physical ports and a selected protocol from among the plurality of protocols, and automatically assigning a virtual function to the logical port from among the plurality of virtual functions associated with the physical function associated with the selected physical port and selected protocol,
wherein the program code is configured to map the logical port to the selected physical port and the selected protocol and automatically assign the virtual function to the logical port in connection with configuring or creating the logical port in response to user input, wherein the program code includes a hypervisor, wherein the selected physical port and the selected protocol are received from a user in connection with configuring or creating the logical port and are received by the hypervisor over an interface, and wherein the hypervisor is configured to automatically assign the virtual function to the logical port.

* * * * *